March 14, 1944.  H. J. LUEHRS  2,344,314
METHOD OF PRODUCING ROTARY CUTTERS
Filed Jan. 30, 1942  4 Sheets-Sheet 1

INVENTOR.
Hans J. Luehrs
BY
attorneys

March 14, 1944.   H. J. LUEHRS   2,344,314
METHOD OF PRODUCING ROTARY CUTTERS
Filed Jan. 30, 1942   4 Sheets-Sheet 2
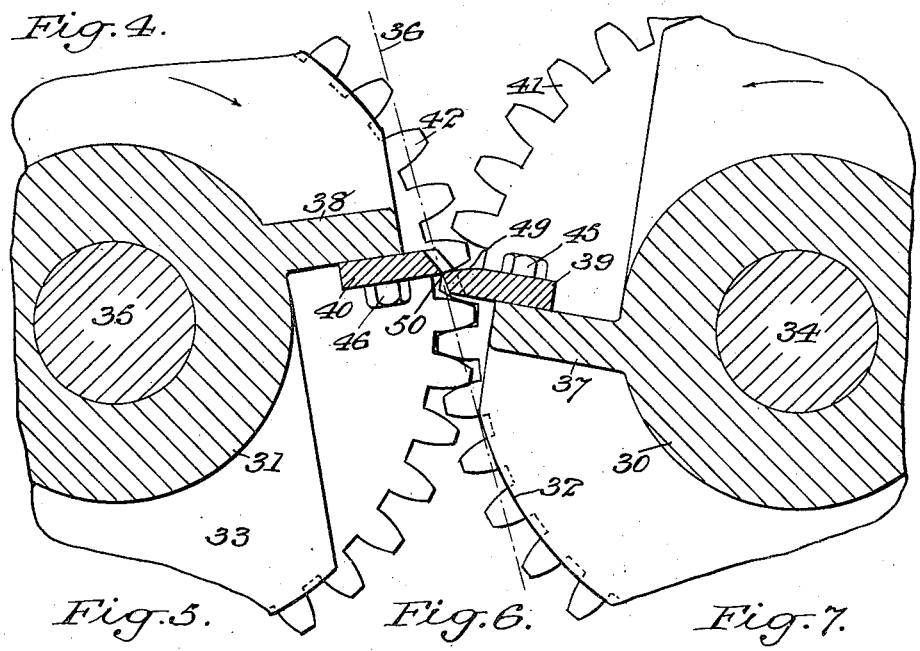
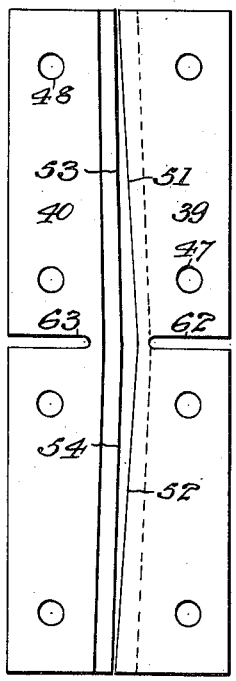 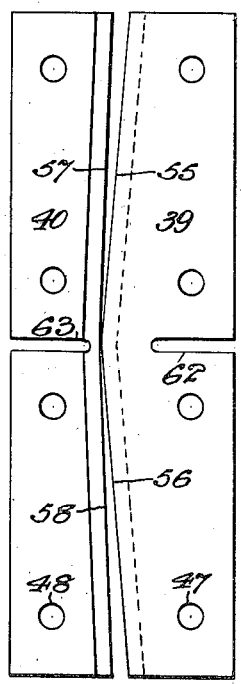 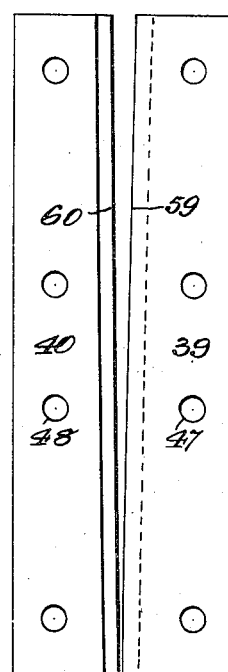
INVENTOR.
Hans J. Luehrs
BY March 14, 1944. H. J. LUEHRS 2,344,314
METHOD OF PRODUCING ROTARY CUTTERS
Filed Jan. 30, 1942 4 Sheets-Sheet 3
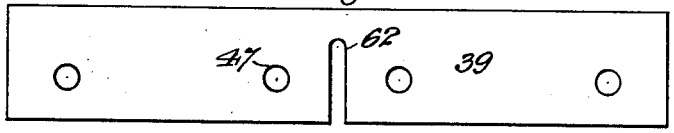
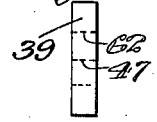
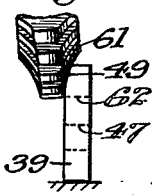
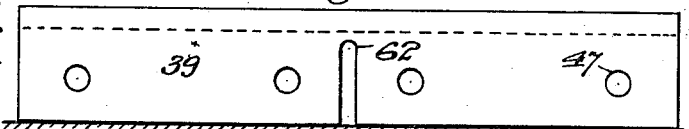
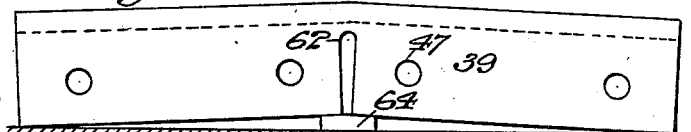
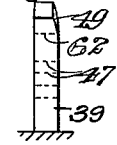
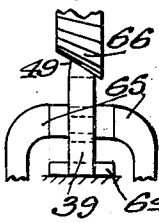
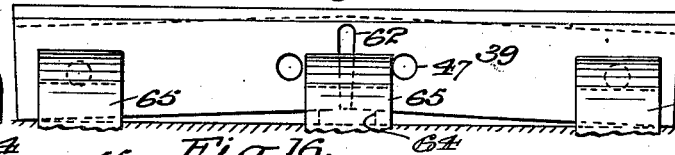
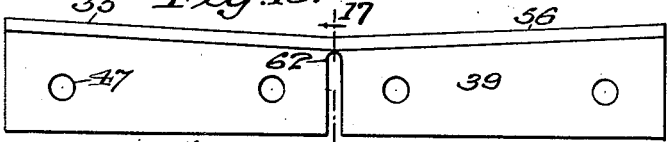
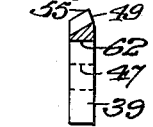
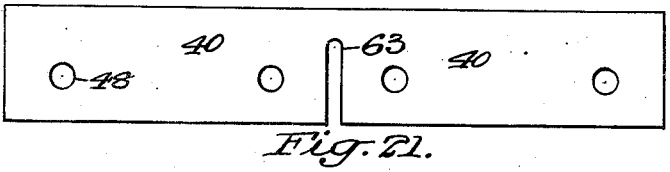
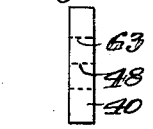
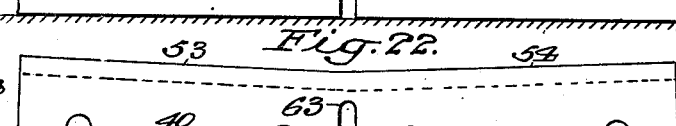
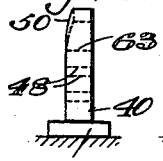
INVENTOR.
Hans J. Luehrs
BY
attorneys March 14, 1944. H. J. LUEHRS 2,344,314
METHOD OF PRODUCING ROTARY CUTTERS
Filed Jan. 30, 1942 4 Sheets-Sheet 4
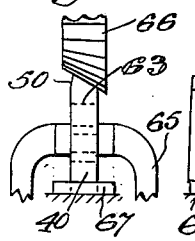
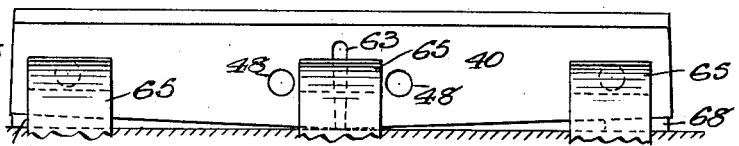
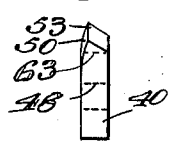
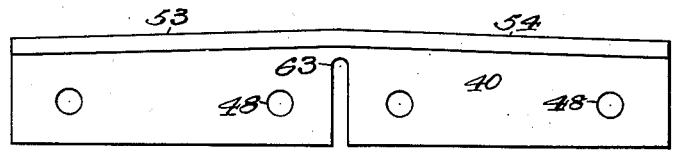
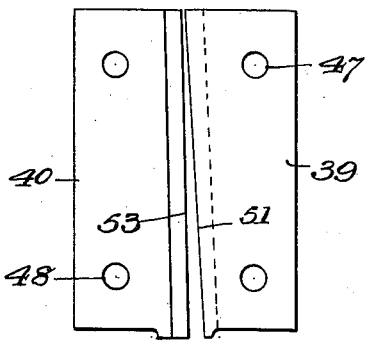
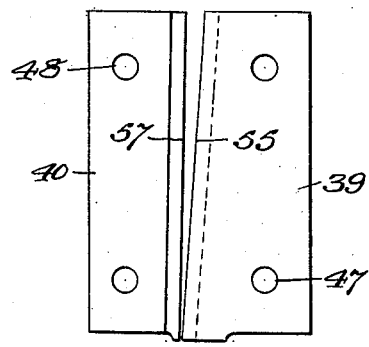
INVENTOR.
Hans J. Luehrs
BY Brown & Award
attorneys Patented Mar. 14, 1944

2,344,314

UNITED STATES PATENT OFFICE 2,344,314

METHOD OF PRODUCING ROTARY CUTTERS

Hans J. Luehrs, Westerly, R. I., assignor to C. B. Cottrell & Sons Company, Westerly, R. I., a corporation of Delaware Application January 30, 1942, Serial No. 428,846

8 Claims. (Cl. 76—101)

One object of my invention is to produce novel rotary cutters for shearing a square cut across a traveling web as it passes through the cutters.

A further object is to produce rotary cutters having shaped surfaces, preferably involute surfaces, for exerting pressure on the cutting edges, which cutting edges are formed by a plane surface passing through the said shaped surfaces along the pressure angle between the starting and finishing points of the cut.

A further object is to produce rotary cutters having their coacting sides shaped to provide sliding and rolling contact surfaces during the shearing operation.

A further object is to produce the rotary cutters with radially changing cutting edges for ensuring the shearing of a square cut across a traveling web as the cutters travel with the web.

A further object is to produce rotary cutters in which their radially changing cutting edges in one embodiment are shaped to form different angles for simultaneously shearing the traveling web from its side edges inwardly to an intermediate point; or in another embodiment are shaped to form different angles for simultaneously shearing the traveling web from an intermediate point outwardly through its side edges; or in a third embodiment are radially inclined for shearing the traveling web from one side edge to the other side edge thereof as they travel with the web.

A further object is to produce the coacting sides of the cutter bars with sliding and rolling contact surfaces which are intersected by radially inclined cutting edges.

A still further object is to produce rotary cutters in which the coacting sliding and rolling contact surfaces are involute shaped, to permit the coacting radially inclined edges to overlap each other throughout the shearing operation.

A further object is to produce rotary cutters of the above character which are simple to manufacture and adjust and which will ensure the feeding of the web through the cutters at the surface speed of the cutter bars.

Practical embodiments of my invention which may be produced by my method are represented in the accompanying drawings, in which Fig. 1 represents a detail plan view of one embodiment wherein the rotary cutters are shown at the beginning of the web shearing operation, the cutting edges being shaped to simultaneously shear the web in opposite directions from the side edges of the web to its middle point;

Fig. 4 represents a more complete detail cross section, on a smaller scale, through the rotary cutters in the same plane as Figs. 2 and 3;

Fig. 5 represents a detail side view, on the same scale as Fig. 4, of the cutter bars shown in Figs. 1 to 4, inclusive;

Fig. 6 represents a detail side view, on the same scale as Fig. 4, of another embodiment wherein the cutter bars have their coacting cutting edges radially inclined to simultaneously shear the web, in opposite directions from its middle point, outwardly through the side edges of the web;

Fig. 7 represents a detail side view, on the same scale as Fig. 4, of a third embodiment wherein the cutter bars have their coacting cutting edges shaped to shear a square cut across the web from one side edge to the other side edge thereof during the travel of the web;

Fig. 8 represents a side view of a normally straight resilient cutter bar on which both the involute contact surface and the cutting edges forming a reentrant angle, are to be milled;

Fig. 9 represents an end view of the same;

Fig. 10 represents a view similar to Fig. 9, showing the step of machining the involute contact surface along the cutter bar;

Fig. 11 represents a side view of the cutter bar after the involute contact surface has been milled, the milling cutter being omitted;

Fig. 12 represents a similar view of the cutter bar after it has been sprung out of its normal straight position, ready to have a straight cutting edge milled along the bent bar;

Fig. 13 represents an end view of the same;

Fig. 14 represents an end view of the bar in its bent position, showing the step of milling the cutting edge along the same;

Fig. 15 represents a side view of the bar after the straight cutting edge has been milled along the same, the angular milling cutter being omitted;

Fig. 16 represents a similar view of the bar after it has been allowed to spring back to its normal position to produce two oppositely inclined cutting edges forming a reentrant angle;

Fig. 17 represents a cross section taken in the plane of the line 17—17 of Fig. 16, looking in the direction of the arrows;

Fig. 18 represents a side view of a normally straight resilient cutter bar on which both the involute contact surface and the cutting edges forming a salient angle, are to be milled;

Fig. 19 represents an end view of the same;

Fig. 20 represents a view similar to Fig. 19, showing the step of machining the involute contact surface along the cutter bar;

Fig. 21 represents a side view of the cutter bar after the involute contact surface has been milled, the milling cutter being omitted;

Fig. 22 represents a similar view of the cutter bar after it has been sprung out of its normal straight position, ready to have a straight cutting edge milled along the bent bar;

Fig. 23 represents an end view of the same;

Fig. 24 represents an end view of the bar in its bent position, showing the step of milling the cutting edge along the same;

Fig. 25 represents a side view of the bar after the straight cutting edge has been milled along the same, the milling cutter being omitted;

Fig. 26 represents a similar view of the bar after it has been allowed to spring back to its normal position to produce two oppositely inclined cutting edges forming a salient angle;

Fig. 27 represents an end view of the same;

Figure 2:
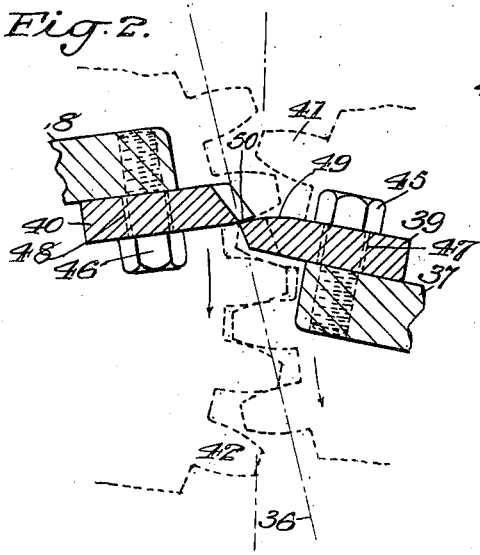
Fig. 2 represents a detail cross section taken in the plane of the line 2—2 of Fig. 1, looking in the direction of the arrows, the intermeshing rotary cutter gears being shown in dotted lines.

Fig. 28 represents a view similar to Fig. 5, with the pair of coacting cutter bars divided at their weakened intermediate points to form two pairs of shorter coacting cutter bars for shearing narrow webs; and Fig. 29 represents a view similar to Fig. 6, with the pair of coacting cutter bars divided at their weakened intermediate points to form two pairs of shorter coacting cutter bars for shearing narrow webs.

The hubs of the pair of coacting rotary cutters are denoted by 30, 31, the cut-away cylindrical discs by 32, 33, and the cutter shafts by 34, 35, which shafts are disposed at right angles to the travel of the web 36 in planes parallel to the web. Radial arms 37, 38 which project from the hubs 30, 31 form seats for the axially straight cutter bars 39, 40 which coact to shear a square cut across the traveling web as it passes through the cutters.

These two rotary cutters are driven in unison by the two pairs of intermeshing gears 41, 42 and 43, 44. These two cutter bars 39, 40 may be radially adjusted on their respective radial arms 37, 38 by providing bolts 45, 46 which pass through enlarged holes 47, 48 in the said cutter bars.

These cutter bars 39, 40 have their coacting sides shaped to form sliding and rolling contact surfaces 49, 50 for obtaining a shearing action on the web, said contact surfaces being shown as having the same involute shape as the teeth of the gears 41, 42 and 43, 44.

I have shown three different embodiments of cutter bars suitable for shearing a square cut across the web as they travel therewith.

Figure 3:
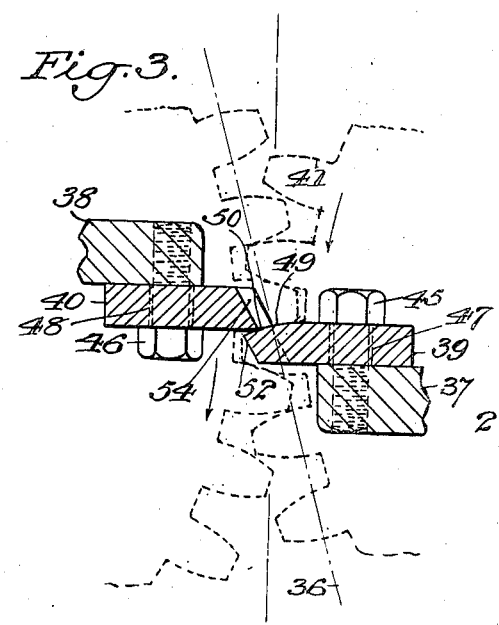
Fig. 3 represents a similar section showing the position of the cutters as they complete their web shearing operation, the intermeshing rotary cutter gears being shown in dotted lines.
Figure 1:
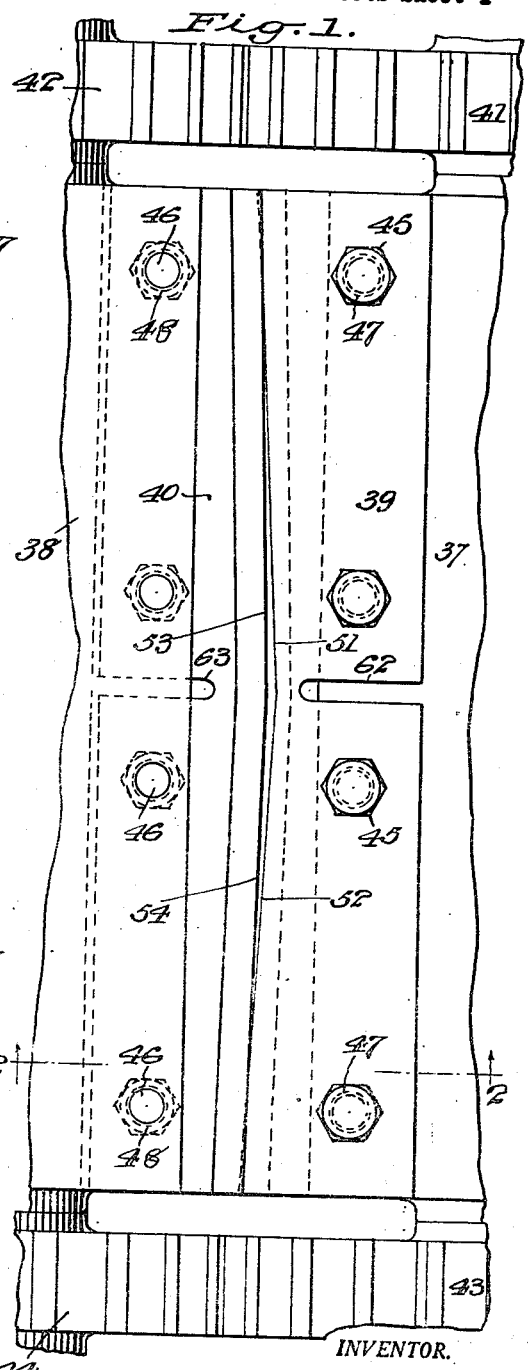

In the embodiment shown in Figs. 1 to 5, inclusive, the cutter bar 39 has its two cutting edges 51, 52 inclined radially at a predetermined degree, from its middle point, to form a reentrant angle, and the cutter bar 40 has its two cutting edges 53, 54 inclined radially at a lesser degree, from its middle point, to form a salient angle. In this embodiment the traveling web 36 will be simultaneously sheared in opposite directions with a square cut from both side edges of the web inwardly, to its middle point, as the cutter bars travel with the web.

In the embodiment shown in Fig. 6, the cutter bar 39 has its two cutting edges 55, 56 inclined radially at a predetermined degree, from its middle point, to form a salient angle, and the cutter bar 40 has its two cutting edges 57, 58 inclined radially at a lesser degree, from its middle point, to form a reentrant angle. In this embodiment the traveling web 36 will be simultaneously sheared, in opposite directions from its middle point, outwardly through the side edges of the traveling web as the cutter bars travel with the web.

In the embodiment shown in Fig. 7, the cutter bars 39, 40 are shown as provided with radially inclined cutting edges 59, 60 respectively arranged to shear a square cut across the traveling web 36 from one side edge to the other side edge of the web as the cutter bars travel therewith.

It will be noted that in the several types of cutter bars hereinbefore described, the cutting edges are formed by a plane surface which passes through the developed sliding and rolling contact surfaces, said cutting edges contacting and shearing along the path of contact between the starting and finishing points of the actual cutting operation. It will also be noted that this path of contact forms an angle to the tangential plane passing through the cutters, which angle is called the pressure angle as in standard intermeshing involute gears, such as those shown in the accompanying drawings.

It will be seen that when the cutter bars have been secured to their respective rotary cutters in proper adjustment, their involute shaped coacting surfaces will exert a sliding and rolling contact from the beginning to the end of the web shearing operation. Said adjustment of the cutter bars will so position the coacting cutting edges that an overlap is maintained to ensure a shearing action by the cutting edges from the beginning to the end of the square cut across the web as the rotary cutters and the web travel together.

The method which I employ for producing the cutter bars with their coacting sliding and rolling contact surfaces and their radially changing cutting edges intersecting the said contact surfaces, is as follows:

The required sides of the cutter bars 39 and 40 of resilient metal, in their normal condition, are shaped from end to end by a suitable milling cutter 61 to form the sliding and rolling contact surfaces 49 and 50 respectively, which surfaces are preferably of involute shape. The cutter bar 39 is weakened at its intermediate or middle point, as by cutting a slot 62 partway across the bar to facilitate the bending of the bar at said point. The cutter bar 40 is similarly weakened at its intermediate or middle point, as by cutting the slot 63 partway across the bar to facilitate the bending of the bar at the said point.

To develop the two cutting edges 51, 52 on the cutter bar 39 to form a reentrant angle, a shim or other suitable device 64 (see Fig. 12) of the desired thickness is placed on a bed or other suitable support under the bar at a point intermediate its ends, preferably the weakened middle point, and downward pressure is exerted on the unsupported ends sufficient to depress the ends a predetermined amount and thereby bend the resilient bar. The cutter bar while held in this bent position, as by vises 65 (see Figs. 12 to 15, inclusive) is machined from end to end by a suitable milling cutter 66 to develop a straight cutting edge along the bar, said cutting edge intersecting the curved or involute sliding and rolling contact surface 49 along the side of the bar. The bar is then released and allowed to spring back to its normal position, thus causing the cutting edge to be bent at its intermediate point to form the two cutting edges 51, 52 slightly inclined outwardly, to produce a flat reentrant angle.

To develop the two cutting edges 53, 54 on the cutter bar 40 to form a salient angle, shims or other devices 67, 68 of the desired thickness are placed under the ends of the bar (see Figs. 22 to 25, inclusive) and pressure is exerted to depress the intermediate or weakened middle point to bend the bar the required amount. The bar while held in such bent position, as by the vises 65 is machined by the milling cutter 66 to develop a straight cutting edge along the bar, which cutting edge intersects the sliding and rolling contact surface 50 along the side of the bar. The bar is then released and allowed to spring back to its normal position, thus causing the cutting edge to be bent to form two cutting edges inclined inwardly, to produce a salient angle. As hereinbefore stated, these two cutter bars 39 and 40 are combined in a pair of rotary cutters to simultaneously shear a square cut across the web from the intermediate or middle point through its side edges, and thereby shorten the length of travel of the web and cutters during the shearing operation.

When cutter bars are to be produced for shearing a narrow traveling web, either of the pairs of coacting cutter bars 39, 40, shown in Fig. 5 or shown in Fig. 6, are divided at their weakened intermediate points for forming two pairs of shorter coacting cutter bars, to shear square cuts across narrow webs.

It is evident that the involute or other sliding and rolling contact surface may be developed along the cutter bar while in its normal position, either before the cutter bar is sprung out of such normal position, or after the cutter bar has sprung back to its normal position.

It will be observed that the positioning of the axes of the rotary cutters at right angles to the travel of the web and parallel to the web will so dispose the axially straight cutter bars that their radially changing cutting edges will ensure a square cut across the traveling web with a shearing action.

It will also be seen that the involute shaped sliding and rolling contact surfaces of the two coacting rotary cutters are so disposed as to press the web slightly out of its normal travel during the shearing operation, to ensure a positive and accurate shearing cut across the web as the cutter bars travel therewith.

It will also be seen that where the cutter bars are each provided with two cutting edges, radially inclined from a middle point at different degrees, the cutters are enabled to shear a square cut across the web of a predetermined width with half the travel of the cutters and web during the shearing operation.

It will also be seen that by mounting the shafts of the cutters at right angles to the travel of the web in planes parallel to the web the involute shaped contact surfaces will have provided cutting edges which will not only cut square across the web but will also travel in unison therewith providing the web is traveling along the path of contact at the surface speed of the cutters.

What I claim is:

1. The herein described method which consists in bending a resilient flat bar at an intermediate point in the plane of its greatest cross sectional dimension, developing a straight cutting edge along one side of the bent bar from end to end thereof and allowing the bar to spring back to its normal position to form two oppositely inclined straight cutting edges along said side of the bar.

2. The herein described method which consists in developing a sliding and rolling contact surface along one side of a resilient flat bar, bending the bar at an intermediate point in the plane of its greatest cross sectional dimension, developing a straight cutting edge intersecting said contact surface along the same side of the bent bar and allowing the bar to spring back to its normal position to form two oppositely inclined straight cutting edges along said side of the bar.

3. The herein described method which consists in weakening a resilient flat bar at an intermediate point in the plane of its greatest cross sectional dimension, bending the bar at its weakened portion, developing a straight cutting edge along one side of the bent bar and allowing the bar to spring back to its normal position to form two oppositely inclined straight cutting edges along said side of the bar.

4. The herein described method which consists in weakening a resilient flat bar at an intermediate point in the plane of its greatest cross sectional dimension, developing a sliding and rolling contact surface along one side of the bar, bending the bar at its weakened portion, developing a straight cutting edge intersecting said sliding and rolling contact surface and allowing the bar to spring back to its normal position to form two oppositely inclined straight cutting edges along said side of the bar.

5. The herein described method which consists in bending a resilient flat bar at an intermediate point in the plane of its greatest cross sectional dimension, developing a straight cutting edge along one side of the bent bar from end to end thereof and allowing the bar to spring back to its normal position to form two oppositely inclined straight cutting edges along said side of the bar and severing the bar at its intermediate point to form two shorter bars having inclined straight cutting edges.

6. The herein described method which consists in developing a sliding and rolling contact surface along one side of a resilient flat bar, bending the bar at an intermediate point in the plane of its greatest cross sectional dimension, developing a straight cutting edge intersecting said contact surface along the same side of the bent bar and allowing the bar to spring back to its normal position to form two oppositely inclined straight cutting edges along said side of the bar and severing the bar at its intermediate point to form two shorter bars having inclined straight cutting edges.

7. The herein described method which consists in weakening a resilient flat bar at an intermediate point in the plane of its greatest cross sectional dimension, bending the bar at its weakened portion, developing a straight cutting edge along one side of the bent bar and allowing the bar to spring back to its normal position to form two oppositely inclined straight cutting edges along said side of the bar and severing the bar at its weakened portion to form two shorter bars having inclined straight cutting edges.

8. The herein described method which consists in weakening a resilient flat bar at an intermediate point in the plane of its greatest cross sectional dimension, developing a sliding and rolling contact surface along one side of the bar, bending the bar at its weakened portion, developing a straight cutting edge intersecting said sliding and rolling contact surface and allowing the bar to spring back to its normal position to form two oppositely inclined straight cutting edges along said side of the bar and severing the bar at its weakened portion to form two shorter bars having inclined straight cutting edges.

HANS J. LUEHRS.